United States Patent

[11] 3,584,295

[72] Inventors Herbert Bayer
Reutlingen;
Peter Harzer, Eningen; Gunther Hoffmann,
Eningen; Bernd Zabel, Reutlingen, all of,
Germany
[21] Appl. No. 737,544
[22] Filed June 17, 1968
[45] Patented June 8, 1971
[73] Assignee Wandel & Goltermann
Reutlingen, Germany
[32] Priority June 15, 1967
[33] Germany
[31] W 44178

[54] SELECTIVE MEASURING SYSTEM FOR LEVEL AND/OR PHASE DIFFERENCES WITH DIGITAL CALIBRATION
18 Claims, 3 Drawing Figs.

[52] U.S. Cl. .................................................. 324/57,
324/83
[51] Int. Cl. ..................................................... G01r 27/00
[50] Field of Search ............................................ 324/57 D,
57 NBC, 83 D, 57 ABC, 57 A, 57 FP, 57, 83

[56] References Cited
UNITED STATES PATENTS
2,622,127 12/1952 Alsberg et al. .................. 324/57

3,355,662 11/1967 Haynie et al. .................. 324/57
3,243,699 3/1966 Kummer ....................... 324/57

*Primary Examiner*—Edward E. Kubasiewicz
*Attorney*—Karl F. Ross

ABSTRACT: To measure the attenuation and/or the phase angle of an impedance pad, an alternating current is passed alternately through the test pad and over a path independent of this pad into a heterodyning stage to generate, during a testing cycle, a beat-frequency oscillation of an amplitude and phase varying with the propagation characteristics of the test pad. The beat-frequency oscillation is then transmitted through a calibrated variable-impedance network constituting a digital attenuator or phase shifter which is progressively adjustable until its output matches a given reference voltage or phase. This reference parameter may be established during a calibrating cycle when the input wave bypasses the test pad in a zero or other reference position of the variable-impedance network while a feedback loop from a comparison circuit adjusts the generator of the reference signal to a balancing position; in a modified system, a fixed reference parameter may be alternately compared with corresponding parameters of a test wave and a standard wave, with concurrent stepping of two counters and resetting of one counter measures the difference in the magnitudes of these corresponding parameters.

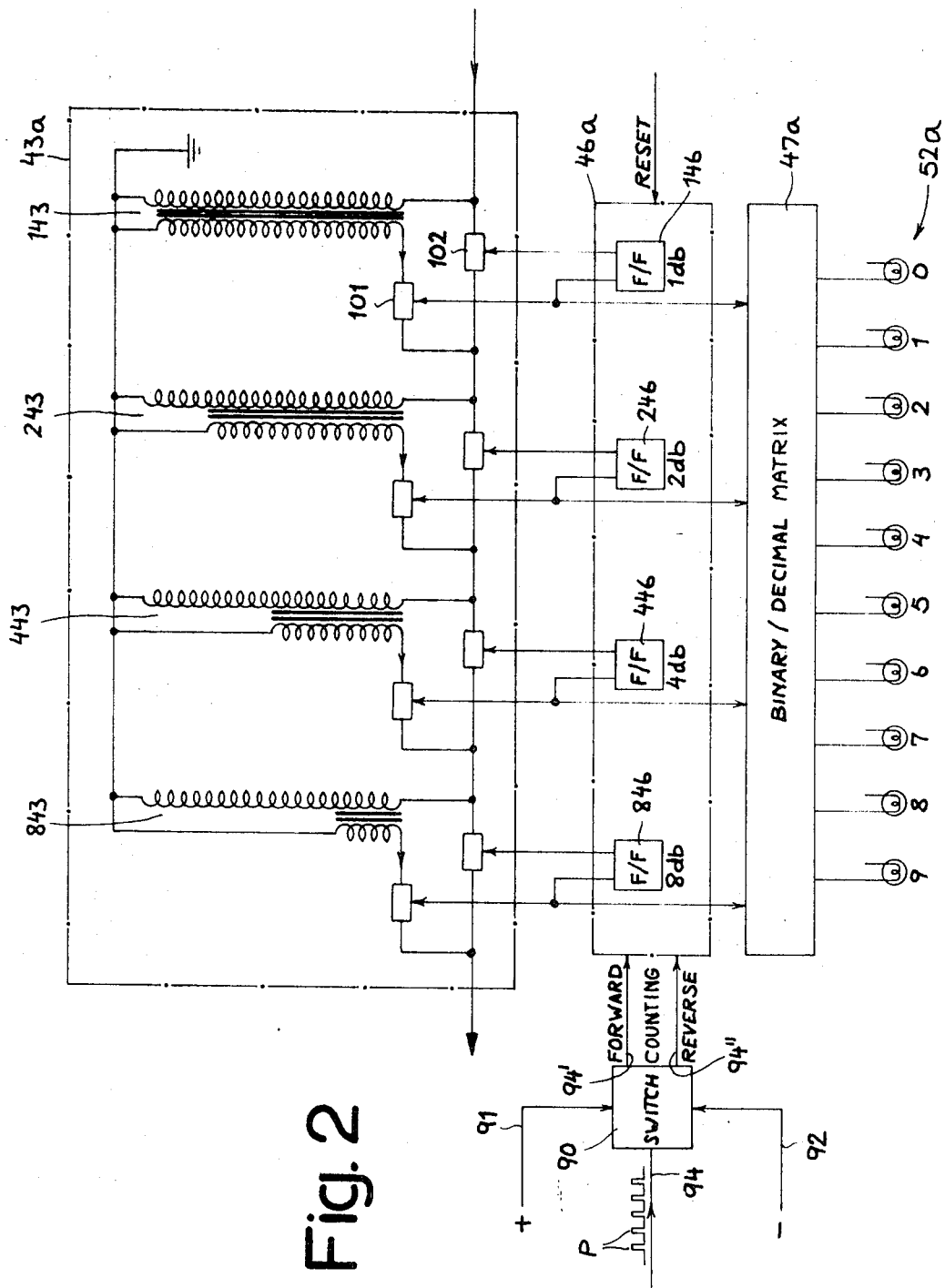

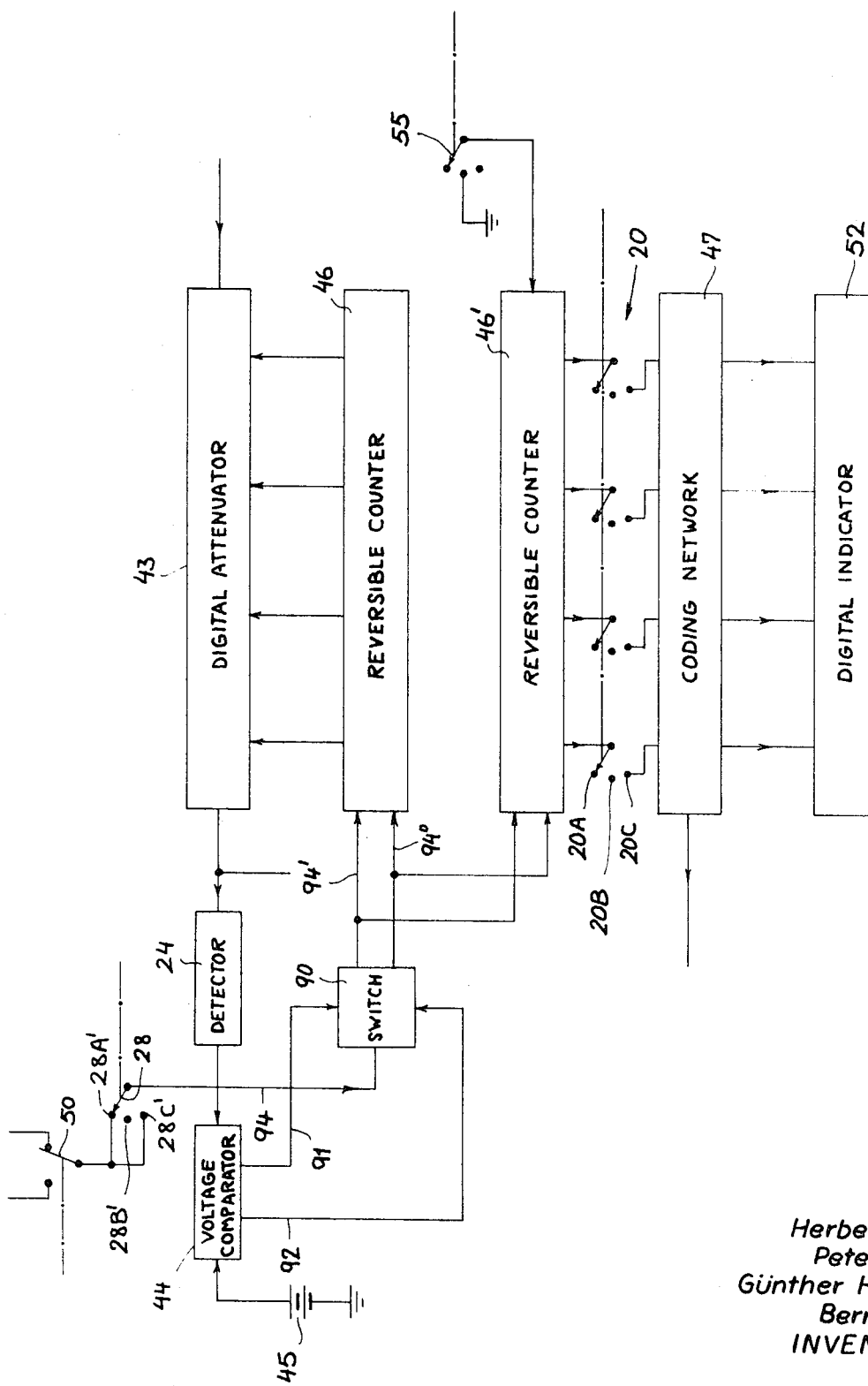

SELECTIVE MEASURING SYSTEM FOR LEVEL AND/OR PHASE DIFFERENCES WITH DIGITAL CALIBRATION

Our present invention relates to a system for ascertaining the propagation characteristics of an impedance network, hereinafter referred to as a test pad, by determining the effect which this network has upon the amplitude and phase, or either of these parameters, of an alternating current passed therethrough.

The general object of our invention is to provide reliable and conveniently operable means for making this determination by passing an input wave of stable frequency alternately through the test pad and over a path independent of that pad to a comparison circuit to determine the difference in amplitude and/or phase of the respective output oscillations.

In somewhat more general terms, our invention aims at providing improved circuitry for comparing the amplitudes and/or phases of two oscillations of like frequency occurring at different times.

In accordance with our present invention, we realize the aforestated objects by providing a variable-impedance network, operable as an attenuator or a phase shifter, which receives the oscillation to be measured and is progressively adjustable until its output matches a reference voltage or phase; this variable-impedance network consists of a plurality of calibrated sections each designed to introduce a predetermined incremental value of the parameter which the network is designed to modify. From the combination of sections effectively connected in circuit when the difference between the network output and the reference parameter is zero, an indicator electronically coupled with the network registers the value of the introduced attenuation or phase shift with an accuracy determined by the smallest incremental value for which these sections are designed.

Advantageously, these incremental values are relatively proportioned according to the antilogarithms of respective powers of 2, four such binary sections (e.g. of numerical weights 1, 2, 4, 8, or 1, 2, 2, 4 in terms of actual or simulated damping effect) being then required to reproduce the numerical values from 0 to 9. If conversion from a binary to a decimal progression is desired, the network may thus include four $n$ sections in cascade where $n$ is the number of decades to be encompassed.

According to another feature of our invention, the stepping of the variable-impedance network through its various digital combinations proceeds under the control of a train of relatively fast pulses as long as the absolute difference between the network output and the reference parameter exceeds a predetermined magnitude, this rate being substantially reduced upon said difference dropping below that threshold.

Since attenuation and especially phase are functions of frequency, another feature of our invention calls for the insertion of the calibrated network into the output circuit of a heterodyning stage in which the input frequency, adjustable or spontaneously variable within a certain band, is mixed with a locally generally oscillation to produce an AC signal of invariable beat frequency whose amplitude and phase vary with the corresponding parameters of the input wave. This beat-frequency signal may also be used as a pacemaker for a pulse generator which produces the stepping pulses for the counter during either the fast or the slow counting stage, preferably the latter.

The reference voltage or phase need not be a fixed value but may be established, periodically or otherwise, just before the testing or measuring cycle in which the desired parameter of the input wave is to be ascertained. For this purpose, during a calibrating cycle immediately preceding the testing cycle, a wave of standard amplitude and/or phase is passed along the transmission path including the calibrated network which has been reset to zero or to some other predetermined position. A comparison circuit, receiving the output of the calibrated network together with that of a generator producing the reference voltage or phase, then feeds back an imbalance signal to a control means for this reference generator to adjust the latter until a balance is established. The reference generator is maintained by a clamping circuit in this position of adjustment so that the magnitude or phase of its output remains substantially unchanged during the following testing cycle. When the system is used to determine the attenuation and/or the phase shift of a test pad, the standard wave is generally an input oscillation identical with that used during testing but bypassing the test pad. No clamping circuit is needed if, pursuant to another feature of our invention, two concurrently stepped counters are provided, one counter being reset before each calibrating (or testing) cycle so as to register only the difference between the two wave parameters as measured against a common reference parameter.

The clamping of a reference voltage in a calibrating cycle may be accomplished with the aid of a differential amplifier deriving a biasing potential from a charged condenser as disclosed in commonly owned application Ser. No. 693,431 filed Dec. 26, 1967 by Herbert Bayer. For phase comparison, the generator of the reference signal may be a variable oscillator which, during a calibrating cycle, is locked in step with the standard wave by means of a voltage-responsive reactance (e.g. a varactor) whose control voltage, derived from the comparator output, is clamped during testing by a condenser, this in the same manner as the reference voltage used for amplitude measurement.

The invention will be more fully described with reference to the accompanying drawing in which:

FIG. 2 is a more detailed diagram of certain constituents of the system of FIG. 1; and FIG. 3 is a partial circuit diagram showing a modification of the system.

Figure 1:
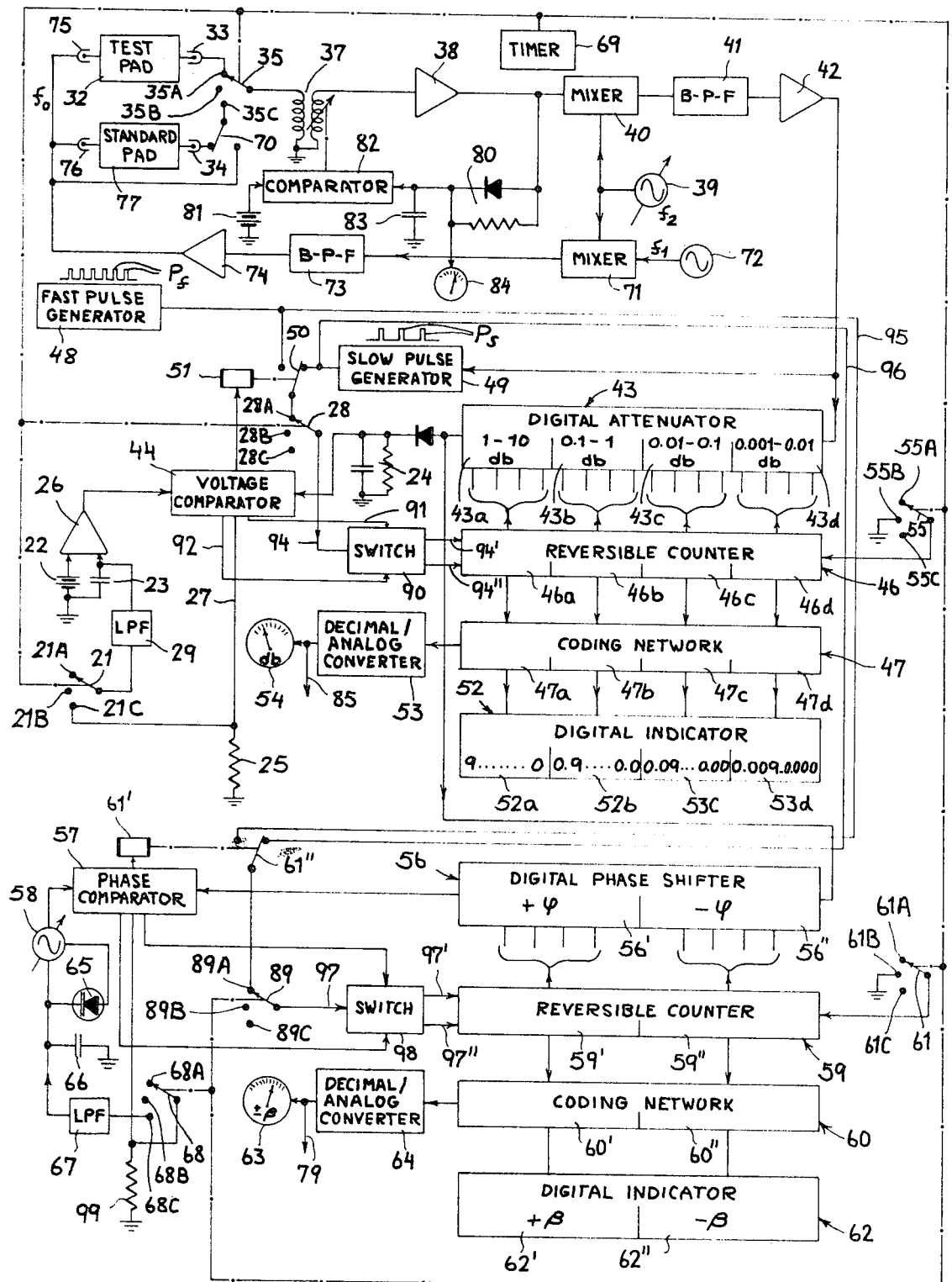
FIG. 1 is an overall circuit diagram of a testing system according to the invention, having means for measuring both the amplitude and the phase of an input wave.

The system shown in FIG. 1 comprises a fixed-frequency oscillator 72 whose output frequency $f_1$ is combined in a mixer 71 with an output frequency $f_2$ of a variable-frequency oscillator 39, thereby yielding a test frequency $f_0$ passed by a narrow-band filter 73 and an amplifier 74. The wave of frequency $f_0$ is applied, in parallel, to input terminals 75 and 76 of a test pad 32 and a standard pad 77 whose output terminals 33, 34 are connected to respective bank contacts 35A, 35C of a switch 35 controlled by a timer 69. The connection between terminal 34 and contact 35C includes a manual switch 70 which may be reversed to apply the frequency $f_0$ directly to switch 35, without interposition of pad 77. Terminals 33, 34 and 75, 76 have been shown as plug-and-jack connections designed to facilitate the substitution of different networks for the pads 32 and 77.

Switch 35 is connected to the input of a broadband amplifier 38 by way of a voltage divider 37, shown as an adjustable transformer, designed to select a suitable amplitude level for the oscillations reaching this amplifier. For this purpose, a detector circuit 80 integrates the output of amplifier 38 and delivers a unipolar voltage to a level-control circuit including a condenser 83 in one input of a comparison circuit 82 whose other input is energized from a source of reference voltage 81 shown as a battery. Comparator 82 determines whether the charging voltage of condenser 83 falls within a predetermined range centered on the reference voltage of battery 81; if this charging voltage is either too low or too high, the output of the comparator reduces or increases the stepdown ratio of transformer 37 which is representative of any network suitable for this purpose, e.g. a set of graduated impedances alternately connectable in circuit with amplifier 38. Naturally, the output of amplitude gate 81 — 83 could also be used to adjust the gain of the amplifier in lieu of, or in addition to, changing its input impedance. The potential of condenser 83 may be read on an indicator 84.

Amplifier 38 works into a mixer 40 also receiving the local oscillation $f_2$ from generator 39, the resulting beat frequency being the fixed frequency $f_1$ produced by oscillator 72 and passed by a narrow-band filter 31 in the input of a further amplifier 42. Thus, test frequency $f_0$ may be varied at will by adjustment of oscillator 39 without altering the frequency $f_1$ of the beat oscillation appearing in the output of amplifier 42. If such adjustability of the test frequency is not required, a fixed-frequency oscillator may be connected directly to the input terminals 75 and 76, with omission of mixer 71 and oscillator 72.

In accordance with our present invention, the oscillation $f_1$ in the output of amplifier 42 is applied to the input of a digital attenuator 43 having a plurality of decadic stages; four such stages 43a (units), 43b (tenths), 43c (hundredths) and 43d (thousandths) have been illustrated by way of example. With the attenuator 43 calibrated in decibels, stages 43a, 43b, 43c, 43d cover, respectively, the ranges of 1—10 db., 0.1—1 db., 0.01—0.1 db. and 0.001—0.01 db.

Each of these stages is controlled by a matrix of output leads from corresponding stages 46a, 46b, 46c, 46d of a reversible binary counter 46 whose stages also control, via respective stages 47a, 47b, 47c, 47d of a coding network 47, a decimal indicator with stages 52a (0 ... 9 db.) 52b (0.0 ... 0.9 db.) 52c (0.00 ... 0.09 db.) and 52d (0.000 ... 0.009 db.) Network 47 also works, through a decimal/analog converter 53, into an analog indicator 54 graduated in decibels. Owing to the provision of this analog indicator, the highest-order stage or stages of the digital indicator 52 may be omitted, if desired without any loss of reading accuracy. An output lead 85 may convey the attenuation reading to a printer or some other recording device.

Counter 46 has two setting inputs 94', 94'', originating at a switch 90, and a resetting input connected to an armature of a switch 55 which is ganged with the timer-controlled switch 35. Bank contacts 55A, 55C of switch 55 are unconnected whereas contact 55B is grounded.

Two pulse generators 48, 49 are designed to produce a fast train of stepping pulses $P_f$ and a slow train of stepping pulses $P_s$, respectively, these pulse trains being alternately fed to an input lead 94 of switch 90 through an armature 50 of a relay 51. The winding of this relay is energized by the output of a voltage comparator 44 receiving, on the one hand, the output of attenuator 43 by way of a detector 24 and, on the other hand, the output of a differential amplifier 26 with tow inputs respectively connected to a voltage source 22 and to a condenser 23. A switch 21, ganged with switches 35 and 55, is inoperative in its positions 21A, 21B but in its third position 21C connects condenser 23 through a low-pass filter 29 to an output lead 27 of comparator 44 connected to ground via a large resistor 25; lead 27 and amplifier 26 form part of a feedback loop which, by the clamping effect of condenser 23, maintains the left-hand input of comparator 44 at a value exactly balancing the voltage of detector 24 applied to its right-hand input during closure of switch 21. A further switch 28, also ganged with switches 35 and 55, disconnects armature 50 from switch 90 in its positions 28B and 28C, only its bank contact 28A being connected in circuit. This arrangement is generally similar to one disclosed in the aforementioned Bayer application Ser. No. 693,431.

Pulse generator 49 is shown to the output of amplifier 42, in parallel with variable attenuator 43, in order to emit the stepping pulses $P_s$ at a cadence corresponding to the frequency $f_1$ or some harmonic or subharmonic thereof.

The unrectified output of attenuator 43 is further transmitted to the input of a digital phase shifter 56 which also may be subdivided into several decadic stages, only two such stages 56' (for positive phase angles $+\Phi$) and 56'' (for negative phase angles $-\Phi$) having been illustrated by way of example; stages 56' and 56'' are controlled by corresponding stages 59' and 59'' of a reversible counter 59 which work through associated stages 60', 60'' of a coding network 60 into a digital indicator 62 with stages 62' and 62'' registering the logarithmic phase functions $+\beta$ and $-\beta$; another output of network 60 feeds an analog indicator 63 through a decimal/analog converter 64. Again, a lead 79 indicates a connection to a printer or other recording device.

Counter 59 is generally similar to counter 46 and has two setting inputs 97', 97'' emanating from a switch 98 whose feeder lead 97 includes a switch 89, ganged with the timer-controlled switches 35, 55, 21 and 28, a bank contact contact 89A of this switch, and an armature 61'' of a relay 61' having front and back contacts respectively connected to the outputs of pulse generators 48 and 49 via conductors 95 and 96. The winding of relay 61' is controlled by the output of a phase comparator 57 receiving, on the one hand, a phase-reference signal from a variable oscillator 58 and, on the other hand, the output of variable phase shifter 56. Oscillator 58 has a tank circuit including a varactor 65 whose control voltage is taken from a condenser 66 which is chargeable, by way of a low-pass filter 67, from an output of comparator 57 via a switch 68 when the latter is on its bank contact 68C. Switch 68, whose bank contacts 68A and 68B are unconnected, is also ganged with the aforementioned timer-controlled, switches, as is a further switch 61 connected to a resetting input of counter 59; bank contacts 61A, 61C of the latter switch are unconnected while a bank contact 61B thereof is grounded. As in the case of the amplitude-measuring circuit including attenuator 43 and voltage comparator 44, comparator 57 of the phase-measuring circuit also has a feedback loop which includes switch 68, filter 67 and oscillator 58; upon closure of switch 68, which coincides with an open position of switch 89, an output lead of the comparator (connected to ground through a large resistor 99) charges the condenser 66 to a voltage which locks the oscillator 58 at an output frequency and phase matching those of the oscillation $f_1$ in the output of phase shifter 56 while the counter 59 is in its reset position. The reset positions of counters 46 and 59 do not necessarily correspond to zero damping of attenuator 43 and zero phase shift or network 56, respectively, , but may be selected in any manner consistent with the transmission characteristics of the circuit through which the standard wave $f_0$ must pass during calibration (including pad 77 if switch 70 is in its illustrated position).

Since the two testing circuits 43, 46, 47, 52 and 56, 59, 60, and 62 are analogous to one another, except for the facet that networks 43 and 56 introduce attenuation and phase-shift increment, respectively, only the first of these circuits need to be be described in greater detail; also, inasmuch as all the stages of network 43 are of identical construction and differ only in the magnitude of their (simulated) damping factors, a description of one of these stages will suffice.

Thus, we have shown in FIG. 2 the units stage 43a of attenuator 43 together with associated stages 46a, 47a and 52a of components 46, 47 and 52. Stage 43a consists of four calibrated sections designated 143, 243, 443 and 843, the hundreds digits of these reference numerals ("1, "'2, "'4, "'8") representing the logarithms of the simulated damping factors introduced thereby. Each of these attenuator stages is represented by a voltage-stepdown transformer whose stepdown ratio corresponds to the apparent damping increment to be introduced thereby, i.e. of 1 db. in the case of transformer 143, 2 db. in the case of transformer 243, 4 db. in the case of transformer 443 and 8 db. in the case of transformer 843; thus, $20\delta = \log R$ where $\delta$ is the damping increment in decibels and R is the turns ratio of the transformer. With these transformers connected in cascade, as shown, their stepdown ratios are multiplicatively combined which, of course, corresponds to an additive combination of their logarithmic damping increments.

As further shown for counter stage 46a, each of these stages consists of four flip-flops which have been designated 146, 246, 446 and 846, again in conformity with the respective damping increments. Each flip-flop has two output leads respectively controlling a pair of current gates which have been designated 101 and 102 in the case of transformer 143. Gate 101, open in the set condition of flip-flop 146, connects the output of the secondary of transformer 143 across the primary of the succeeding transformer 243; gate 102 opens when the flip-flop 146 is reset, bypassing the secondary of transformer 143 and directly connecting its primary across that of transformer 243. The several flip-flops are selectively tripped, in a manner well known per se, under the control of stepping pulses P from output lead 94' or 94'' of switch 90, one or the other of these leads being connected to input lead 94 if a positive or a negative imbalance signal in the output of comparator 44 (FIG. 1) energizes the respective control lead 91 and 92 of the switch. With lead 91 energized, the sequence of operation of flip-flops 146, 246, 446 and 846 is such that the sum of the numerical weights (1, 2, 4, 8) of the associated transformers inserted in circuit varies progressively from 0 through 9 upon the occurrence of every 1000th stepping pulse. It will be understood that the switching occurs at every 100th pulse in stage 43b, every 10th pulse in stage 43c and every pulse in stage 43d.

Relay 51 operates when the voltage difference between the two inputs of comparator 44 is large, attracting its armature 50 and connecting the high-rate pulse generator 48 to lead 94 whereby counter 46 is r rapidly stepped in a forward or backward direction, depending upon the polarity of the voltage difference and the resulting energization of either lead 91 or lead 92. When the absolute value of this voltage difference is reduced below a predetermined threshold, relay 51 releases so that the final adjustment of the attenuator 43 occurs at a relatively slow rate; this reduces or eliminates hunting of the counter.

In an analogous manner, relay 61' (FIG. 1) responds to the absolute magnitude of the output of phase comparator 57 to connect input lead 97 of switch 98, which controls the counter 59, to either of the two pulse sources 48, 49 via leads 95, 96.

Stage 47a (FIG. 2) of coding network 47 consists of a conventional binary/decimal matrix which energizes any one of 10 indicator lamps 52a in response to the setting of a corresponding combination of the flip-flops of counter stage 46a. Indicators 52 and 54 display, on a linear scale, the sum of the logarithms of the attenuation increments introduced by the binary sections 143 etc. of the several stages of network 43. By the same taken, the incremental phase-shifting sections of network 56 may operate in tandem of the antilogarithms of the values of angle function $\pm\beta$ whose sum is linearly displayed by indicators 62 and 63.

We shall now describe a complete operating period of the system shown in FIG. 1, including a calibrating cycle and a test cycle established by the timer 69.

Let us assume that the system has just completed a test and that switches 21, 28, 35, 55, 61, 68 and 89 stand on their respective "A" contacts. On being moved to their alternate "C" positions by the timer 69, these switches pass briefly through their intermediate or "B" positions in which the reset leads of counters 46 and 59 are grounded by switches 55 and 61. This grounding switches all the flip-flops of each counter stage, or sets a predetermined combination of flip-flops corresponding to a desired reference value for the attenuation and the phase shift, respectively. When the switches arrive on their "C" contacts, input wave $f_0$ passes through the heterodyning stage 38—42 and gives rise to beat-frequency oscillation $f_1$ which successively traverses the attenuator 43 and the phase shifter 56. With the attenuator output at its reference value, the closure of the feedback loops of comparator 44 and 57 by switches 21 and 68 establishes a corresponding reference parameter at the left-hand inputs of these comparators, this parameter being held substantially constant upon the subsequent switchover to position "A" in which the feedback loops are open and switches 90, 98 are connected to pulse source 48 or 49 via relay armatures 50 and 61''. At the same time, the input wave $f_0$ is forced to traverse the test pad 32 whose transmission characteristics are reflected in a damping and a phase shift generally different from those of the standard wave transmitted during the preceding calibrating cycle. If, for example, test pad 32 has a lower attenuation than standard pad 77, comparator 44 delivers a "positive" imbalance signal on lead 91 so that stepping pulses P (FIG. 2) energize the "forward" input 94' of counter 46, thus switching the flip-flops thereof in rapid succession until the absence of potential on both leads 91 and 92 indicates that balance has been restored. Substantially at the same time, comparator 57 may energize the input lead 97' or 97'' so that phase shifter 56 is stepped forward or backward until the imbalance signal disappears. Pulses P are, of course, representative of either pulse train $P_f$ or $P_s$, the change from generator 48 to generator 49 occurring not necessarily simultaneously in the attenuation and phase circuits.

When the attenuation counter 46 has come to rest, the test wave in the input of phase shifter 56 will have the same amplitude as the standard wave during the preceding calibrating cycle; this eliminates the influence of amplitude variations upon the reading of the phase as delivered by indicators 62 and 63.

Further timer-controlled switches, not shown, may of course be provided to disconnect the indicators 52, 54, 62 and 63 from their associated coding networks 47 and 60 in the "C" positions of switches 35 etc. so as to prevent fluctuation of the indicator outputs between the measured test value and the reference value.

The integrating network 80 in the output of amplifier 38 should have a large enough time constant to leave the setting of voltage divider 37 unchanged between successive cycles (calibrating and testing); the potential of condenser 83 will then correspond to the larger one of the amplitudes appearing in the input of the integrator during these two cycles. The upper and lower cutoff potentials established by comparator 82 should, of course, be so chosen as to prevent overloading of amplifier 38 while maintaining a satisfactory signal-to-noise ratio. With the voltage divider 37 thus traversed by the wave $f_0$ during both calibrating and testing, its adjustment has no influence upon the reading of the indicators 52 and 54 which measure only the ratio of the respective damping factors of pads 42 and 77.

In the foregoing description it has been assumed that the attenuation of standard pad 77 is invariably greater than that of the pads 32 to be tested. If a line of minimum attenuation is used as the standard (switch 70 reversed), the stepdown transformers of FIG. 2 would have to be replaced by stepup transformers. In the most general case, in which the differences in damping may be either positive or negative, indicator 52 and networks 46, 47 would have to be divided into both positive and negative stages (in the manner illustrated for the corresponding units of the phase-comparison circuit), with network 43 composed in part of stepdown and in part of stepup transformers.

We shall now describe a modification of the system of FIGS. 1 and 2 in which the difference between a certain parameter of a test wave and a corresponding parameter of a standard wave is registered upon successive comparison thereof with a fixed reference parameter. While this feature will be specifically discussed in connection with amplitude measurements, it will be understood that the phase-comparison circuit of FIG. 1 may be similarly modified.

In FIG. 3 the left-hand input of voltage comparator 44 is shown connected to a source 45 of constant voltage. A second reversible counter 46', identical with counter 46, is connected in parallel with the latter to the output of electronic switch 90 so that both counters are stepped concurrently in response to the pulses on lead 94 in the presence of an imbalance signal on conductor 91 or 92. Switch 55 is connected to a resetting input of counter 46' whose output conductors lead to coding network 47 through armatures of a multilevel switch 20 having bank contacts 20A, 20B and 20C. Switch 20, ganged with the other timer-controlled switches, completes the connection to network 47 only in its "calibrating" position (contact 20C). Also, switch 28 of FIG. 1 has been replaced by a switch 28' with bank contacts 28A', 28B' and 28C', this switch connecting lead 94 to relay armature 50 in both "testing" and "calibrating" positions.

The system of FIG. 3 operates as follows:

In testing position "A," the amplitude of the wave to be measured is fed through attenuator 43 and detector 24, as before, to the right-hand input of voltage comparator 44 which generates an imbalance signal on lead 91 or 92 if this amplitude level exceeds or falls short of the reference voltage of battery 45. Counter 46 is stepped until the balance is established; counter 46' (whose setting at this time will generally differ from that of counter 46) advances or retreats ineffectually in the same rhythm, its output being open-circuited at switch 20. Next, in the intermediate position "B," counter 46' is reset to zero or some other starting position assigned to the pad 77; counter 46 does not move, its input circuit being open at switch 28'. Finally, in the calibrating position "C," comparator 44 measures the reference voltage from battery 45 against the amplitude of the standard wave as supplied by detector 24. If this amplitude exactly equals that measured during the preceding testing cycle with the same setting of network 43, the comparator does not generate an imbalance signal and counter 46 remains at zero, indicating the absence of a level difference; if, however, such a difference does exist, both counters are stepped until the balance is restored, the resulting setting of counter 46' being a measure of that difference and being registered on indicators 52 and 53 (FIG. 1).

If only the absolute values of the measured differences are of interest, counter 46' will be stepped only forward by pulses appearing on either lead 94' or lead 94''.

The system of FIG. 3 will, of course, operate in essentially the same way if calibration and testing occur in positions "A" and "C," respectively, i.e. if pads 32 and 77 are interchanged.

With rapid alternation between calibrating and testing, the indicators 52, 54, 62, 63 may have sufficient mechanical and/or electrical inertia to maintain their positions from one test cycle to the next.

Naturally, our disclosed system may also be utilized to compare the amplitudes (and/or, in the case of identical frequencies, the phases) of different oscillations propagated over the same transmission path, rather than a given oscillation traveling alternately over different branches (32, 77) of that path. It will also be understood that calibrated resistors instead of transformers may be used in the attenuation stages of network 43, even though this is less advantageous since it dissipates part of the available energy.

We claim:

1. A system for measuring electric waves, comprising:
   circuit means for establishing a transmission path for an electric wave having a transmission-dependent parameter to be measured;
   a network of variable transmission characteristics which affect said parameter of a wave propagated over said transmission path, said network being connected to said circuits means and composed of a plurality of calibrated sections selectively insertable in said transmission path;
   signal-generating means for establishing a reference parameter;
   comparison means simultaneously connected to the outputs of said signal-generating means and of said network for matching said reference parameter with said parameter of said wave to be measured;
   selector means connected to be operated by said comparison means in response to the output thereof and coupled to said network for successively inserting different combinations of said calibrated sections into said transmission path until said comparison means indicates a balance;
   a source of oscillations for applying a standard wave;
   periodically operative switchover means for alternately applying said standard wave and said wave to be measured to the output of said circuit means for transmission over said path in a succession of calibrating and measuring cycles with establishment of said balance within each cycle;
   and register means coupled to said selector means for translating any difference between the settings of said selector means in successive calibrating and measuring cycles into an indication of the desired parameter.

2. A system as defined in claim 1 wherein the numerical weights of said calibrated sections in terms of their effect upon said desired parameter are the antilogarithms of respective powers of 2, said sections being serially disposed for insertion in cascade.

3. A system as defined in claim 2 wherein said network is subdivided into a plurality of decadic stages each composed of four calibrated sections.

4. A system as defined in claim 1 wherein said desired parameter is amplitude, said sections being calibrated in terms of attenuation.

5. A system as defined in claim 4 wherein said sections are transformers.

6. A system as defined in claim 1 wherein said desired parameter is phase angle and said sections are calibrated in terms of phase shift.

7. A system for measuring electric waves, comprising:
   means for generating a local oscillation;
   circuit means for establishing a transmission path for an electric wave having at least one transmission-dependent parameter to be measured, said circuit means including a heterodyning stage for deriving a wave of fixed beat frequency from said local oscillation and said electric wave;
   a network of variable transmission characteristics which affect said parameter in said wave of fixed beat frequency, said network being connected to said circuit means and composed of a plurality of calibrated sections selectively insertable in said transmission path at a location beyond said heterodyning stage;
   signal-generating means for establishing a reference parameter;
   comparison means simultaneously connected to the outputs of said signal-generating means and of said network for matching said reference parameter with said parameter in said wave of fixed beat frequency;
   selector means connected to be operated by said comparison means in response to the output thereof and coupled to said network for successively inserting different combinations of said calibrated sections into said transmission path until said comparison means indicates a balance;
   a source of oscillations for applying a standard wave;
   periodically operative switchover means for alternately applying said standard wave and said wave of fixed beat frequency to the input of said circuit means for transmission over said path in a succession of calibrating and measuring cycles with establishment of said balance within each cycle; and
   register means coupled to said selector means for translating any difference between the settings of said selector means in successive calibrating and measuring cycles into an indication of the desired parameter.

8. A system as defined in claim 7 wherein said selector means comprises reversible binary counter means and a source of stepping pulses for said counter means, said source being coupled to the output of said comparison means for emitting said stepping pulses in response to an imbalance signal.

9. A system as defined in claim 8 wherein said source is switchable provided with switch means for changing from a relatively high to a relatively low pulse rate in response to a decrease of the absolute magnitude of said imbalance signal below a predetermined threshold.

10. A system as defined in claim 9 wherein said source includes a pulse generator having input connections to said transmission path for energization by said beat frequency.

11. A system as defined in claim 8, further comprising timer means for periodically operating said switchover means to apply a wave to be measured and said standard wave to the input of said circuit means in a first cycle and in a second cycle, respectively, said counter means being provided with resetting means connected to said switchover means for establishing a starting position upon transition from one of said cycles to the other.

12. A system as defined in claim 11 wherein said counter means comprises a first counter and a second counter connected in parallel to said source for concurrent stepping thereby, said first counter being operative to insert said combinations of calibrated sections, said second counter being connected to operate said register means and being provided with said resetting means.

13. A system as defined in claim 7, further comprising adjustable level-control means connected in said transmission path ahead of said network for alternate traversal by said standard wave and the wave to be measured.

14. A system as defined in claim 13 wherein said level-control means includes a broadband amplifier and an amplitude gate responsive to the output of said amplifier for holding the output amplitude thereof within predetermined limits.

15. A system as defined in claim 7, for measuring attenuation and phase angle representing two transmission-dependent parameters, wherein said network comprises a first unit with sections calibrated in terms of attenuation and a second unit with sections calibrated in terms of phase shift, said units being connected in cascade to the output of said heterodyning stage for receiving said wave of fixed beat frequency therefrom.

16. A system for measuring electric waves, comprising:
circuit means for establishing a transmission path for an electric wave having at least one transmission-dependent parameter to be measured;
a network of variable transmission characteristics which affect said parameter of a wave propagated over said transmission path said network being connected to said circuit means and composed of a plurality of calibrated sections selectively insertable in said transmission path;
signal-generating means for establishing a reference parameter, including at least one variable voltage generator and control means therefor;
comparison means connected to the outputs of said voltage generator and of said network for matching said reference parameter with said parameter of the wave to be measured, said comparison means being provided with a feedback loop extending from the output thereof to said control means;
selector means connected to be operated by said comparison means in response to the output thereof and coupled to said network for successively inserting different combinations of said calibrated sections into said transmission path until said comparison means indicates a balance;
a source of oscillations for supplying a standard wave;
periodically operative switchover means for alternately applying said standard wave and the wave to be measured to the input of said circuit means in a succession of calibrating and measuring cycles and for closing said feedback loop during calibrating cycles only, thereby adjusting said voltage generator to establish a reference input for said comparison means matching the output of said network applied to said comparison means at the end of an immediately preceding measuring cycle;
reactive clamping means in said feedback loop for holding said reference input substantially constant during a subsequent measuring cycle; and
register means coupled to said selector means for translating the setting thereof into an indication of the desired parameter.

17. A system as defined in claim 16 wherein said circuit means includes means for generating a local oscillation and a heterodyning stage for deriving a fixed beat frequency from said local oscillation and a wave to be measured and for feeding said beat frequency to said network.

18. A system as defined in claim 16 wherein said desired parameter is phase shift and said voltage generator comprises a variable oscillator, said control means including electronically variable reactance means responsive to the output of said comparison means for locking and oscillator in step with the output of said network.